US008595782B2

(12) United States Patent
Sie et al.

(10) Patent No.: US 8,595,782 B2
(45) Date of Patent: Nov. 26, 2013

(54) MANIPULATING UNUSED PORTIONS OF A VIDEO DISPLAY

(75) Inventors: John J. Sie, Englewood, CO (US); John C. Beyler, Highlands Ranch, CO (US)

(73) Assignee: Starz Entertainment Group LLC, Englewood, CO (US)

( * ) Notice: Subject to any disclaimer, the term of this patent is extended or adjusted under 35 U.S.C. 154(b) by 294 days.

(21) Appl. No.: 12/877,686

(22) Filed: Sep. 8, 2010

(65) Prior Publication Data

US 2011/0085078 A1 Apr. 14, 2011

Related U.S. Application Data

(63) Continuation of application No. 10/802,043, filed on Mar. 15, 2004, now Pat. No. 7,802,288.

(60) Provisional application No. 60/476,503, filed on Jun. 6, 2003, provisional application No. 60/455,009, filed on Mar. 14, 2003.

(51) Int. Cl.
*H04N 7/173* (2011.01)
(52) U.S. Cl.
USPC ............... 725/116; 725/38; 725/39; 725/44; 725/87; 725/91; 725/114; 725/115; 725/117; 725/118; 725/119; 725/120; 725/121; 725/122; 725/123; 725/124; 348/445
(58) Field of Classification Search
None
See application file for complete search history.

(56) References Cited

U.S. PATENT DOCUMENTS

| 5,309,234 | A | * | 5/1994 | Kranawetter et al. | 348/473 |
| 5,907,659 | A | * | 5/1999 | Yamauchi et al. | 386/245 |
| 5,909,531 | A | * | 6/1999 | Kanota et al. | 386/304 |
| 6,137,537 | A | * | 10/2000 | Tsuji et al. | 348/554 |
| 6,169,568 | B1 | * | 1/2001 | Shigetomi | 725/76 |
| 6,272,286 | B1 | * | 8/2001 | Asada et al. | 386/224 |
| 6,769,127 | B1 | * | 7/2004 | Bonomi et al. | 725/39 |
| 7,969,509 | B2 | * | 6/2011 | Harris | 348/558 |
| 2002/0006165 | A1 | * | 1/2002 | Kato | 375/240.25 |
| 2003/0025832 | A1 | * | 2/2003 | Swart et al. | 348/461 |
| 2004/0212731 | A1 | * | 10/2004 | Sie et al. | 348/445 |
| 2006/0061682 | A1 | * | 3/2006 | Bradley et al. | 348/441 |
| 2007/0206932 | A1 | * | 9/2007 | Kato | 386/111 |
| 2009/0025030 | A1 | * | 1/2009 | Kasutani | 725/38 |
| 2010/0177240 | A1 | * | 7/2010 | Harris | 348/445 |

* cited by examiner

*Primary Examiner* — Nasser Goodarzi
*Assistant Examiner* — Paul Graham
(74) *Attorney, Agent, or Firm* — Kilpatrick Townsend & Stockton LLP

(57) ABSTRACT

According to the invention, a video distribution system is disclosed. The video distribution system distributes a video program in a first aspect ratio and includes information to convert the first aspect ratio to a second aspect ratio. Included in the video distribution system are a distribution point and a video converter that is located remotely from the distribution point. The video converter receives the information and the video program from the distribution point. The video converter uses the information to guide conversion between the first aspect ratio and the second aspect ratio.

19 Claims, 16 Drawing Sheets

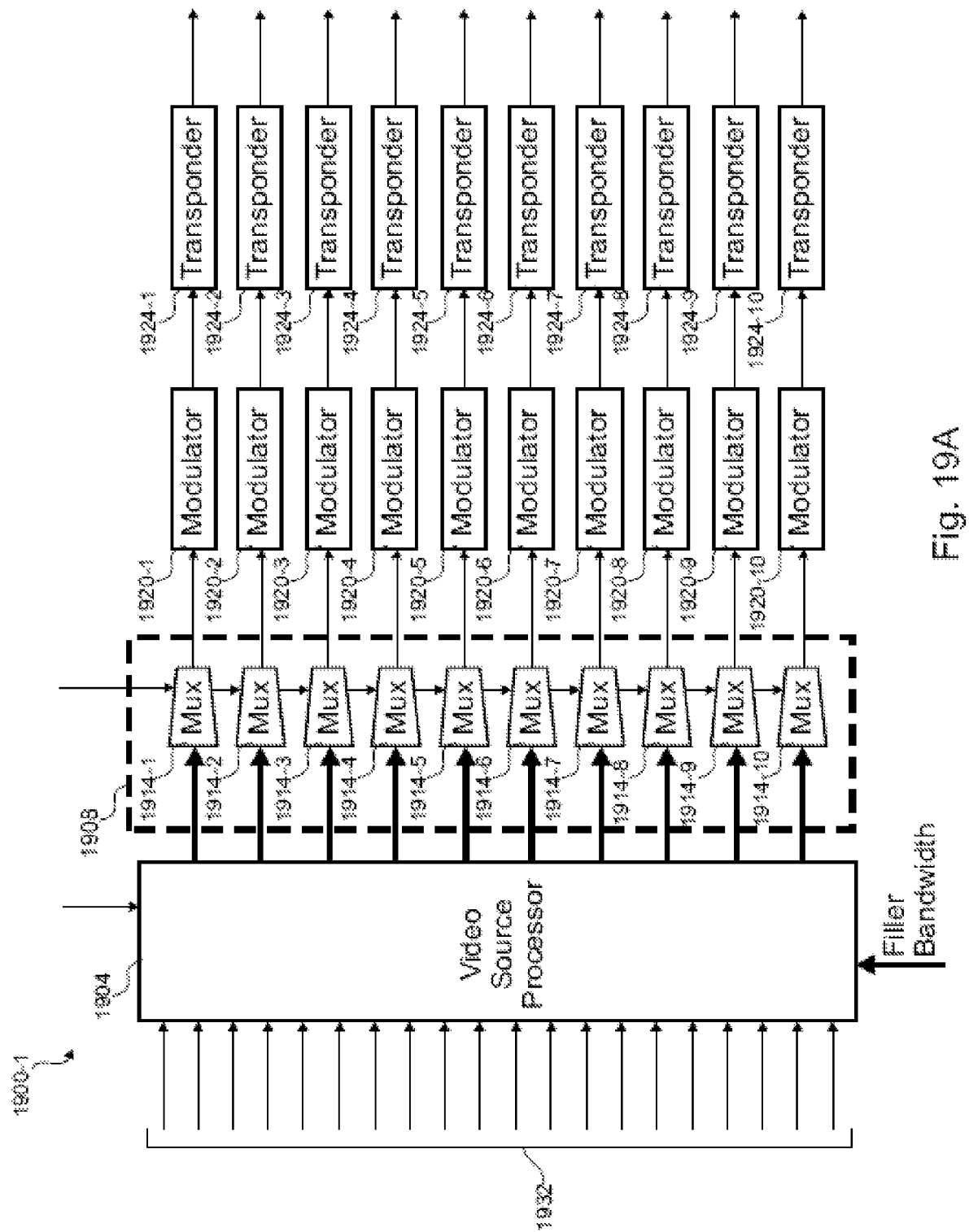

MANIPULATING UNUSED PORTIONS OF A VIDEO DISPLAY

This application is a continuation of U.S. application Ser. No. 10/802,043 filed on Mar. 15, 2004, entitled "VIDEO ASPECT RATIO MANIPULATION", which claims the benefit of and is a conversion of U.S. Provisional Application Ser. No. 60/455,009 filed on Mar. 14, 2003, entitled "TELEVISION ASPECT RATIO MANIPULATION" and U.S. Provisional Application Ser. No. 60/476,503 filed on Jun. 6, 2003, entitled "DIGITAL BROADCAST FORMAT STATISTICAL MULTIPLEXER" all three of which are incorporated by reference in their entirety.

BACKGROUND OF THE INVENTION

This invention relates in general to video systems and, more specifically, to aspect ratio manipulation of video images.

From its standardization in the 1950's, television displays have traditionally used a 4:3 aspect ratio, displaying an image that is four units wide and three units high. A very large quantity of television programs were produced in the 4:3 aspect ratio. In 1996, the FCC adopted new display formats for digital television and chose a 16:9 aspect ratio display for high definition television (HDTV). Beginning in 2002, some television production began shifting from the traditional 4:3 aspect ratio images to 16:9 images in an attempt to "future proof" the product because a 16:9 image may be processed for display on a legacy 4:3 display by cutting off the sides in a process called "pan and scan." Using pan and scan, the center part of the wider aspect ratio image is cropped to produce a 4:3 aspect ratio image. Another conventional technique is the "bob and crop" and is used to convert aspect ratios.

In FIGS. 1 and 2, a conventional 16:9 display 100 and a 16:9 image 200 are respectively shown. In the image depictions of the figures, hatched circle images are used accentuate any distortion to the image. FIGS. 3 and 4 respectively show a conventional 4:3 display 300 and a conventional 4:3 image 400. Today, conventional televisions are available in either format, but other aspect ratios are known. For example, movie theatres may display even wider images.

The pan and scan process uses trained technicians to manually crop a center part of the image with dynamic adjustments of a 4:3 aperture left or right to capture most of the content of the 16:9 image 200. In other words, the edges of the 16:9 image 200 are cut off to fill the 4:3 display 300. In a similar process, a 16:9 aperture pans and scans up and down through a 4:3 image 400, but cuts off horizontal slices of the 4:3 image 400 below and above the 16:9 aperture.

During the transition to digital television there will be a time when broadcasters will transmit signals with both 4:3 and 16:9 images 400, 200. Various consumers will have both 4:3 and 16:9 television sets 300, 100 that respectively display both 4:3 and 16:9 images 400, 200. The optimum viewer experience will exist when the display aspect ratio exactly matches the image aspect ratio, for example a 4:3 display 300 showing a 4:3 image 300 or a 16:9 display 100 showing a 16:9 image 200. In both these cases, the image fills the display and the image is presented with all the available horizontal and vertical resolution possible in the display.

Often the image aspect ratio of the image doesn't match the aspect ratio of their TV display. This will be an ongoing problem because of the large amount of television programs produced in 4:3 aspect ratio. On the other hand, theatrical movies are produced in widescreen format with an aspect ratio of 1.85 or wider, which causes aspect ratio problems also.

There are two conventional ways to present a 16:9 image 200 on a 4:3 display 300, as shown in FIGS. 5 and 6. FIG. 5 uses letterbox format 500 to match the width of the 4:3 display with the width of the 16:9 image 200, producing black bands 508 at the top and bottom of the 4:3 display 300. The 16:9 image height is reduced to 75% of the 4:3 screen height, and the overall displayed image 200 is reduced to 75% of the display area. Because of the fixed vertical scanning structure (physical pixels on LCD and DLP sets, or scan lines on CRT-based displays), available vertical resolution is effectively reduced 25% by the letterbox display 500.

Another problem with the letterbox display 500 is consumer dissatisfaction. When the image doesn't fill the screen, most consumers feel like they are being short-changed, that they are not getting the full value from their television sets. And the black bands 508 are distracting from the viewing experience. Yet another problem with the letterbox display 500 is "burn in" on some types of displays. Since some display elements (or phosphors) are not used in the letterbox display 500, the display elements age differently, and can result in the black bands 508 being "burned in" to the display 500, showing a persistent band even when not using letterbox format.

The second conventional approach to fill the 4:3 display with a 16:9 image is to stretch the image vertically as shown in FIG. 6. This approach would use the entire vertical scanning capability of the 4:3 display 300 to deliver the maximum available vertical resolution. In practice, this approach produces unacceptable geometric distortion which vertically elongates the image 604.

In conventional systems, 4:3 images 400 are commonly shown on 16:9 displays 100 using a pillar box presentation 700, with black vertical bars 708 on the left and right of the image 400. Using this approach that is shown in FIG. 7, the 4:3 image 400 only uses 75% of the available 16:9 screen width. In other words, the 4:3 image 400 uses only 75% of the 16:9 display area. The horizontal resolution is reduced by 25% since every scan line of the image 400 does not utilize all the available pixels of a scan line of the 16:9 display 100. The previous problems with consumer satisfaction and burn-in discussed above also apply to the pillar box display 700. In this case, the vertical pillar boxes 708 will be burned in.

Another approach 800, shown in FIG. 8, is to stretch the 4:3 image 804 to match the width of the 16:9 display 100. The resulting geometric distortion may be tolerable for some kinds of viewing, but the geometric distortion is always present nonetheless.

In conventional systems, some variations on the horizontal stretch apply a more pronounced stretch at the left and right edges of the image, and apply less stretch in the center of the picture. This non-linear type of stretch leaves the geometry in the center of the image relatively unchanged but at the expense of more radical geometric distortions at the left and right edges.

BRIEF DESCRIPTION OF THE DRAWINGS

The present invention is described in conjunction with the appended figures:

FIG. 19A is a block diagram of an embodiment of a video processing system for the DBS system;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a video distribution system. The video distribution system distributes a video program in a first aspect ratio and includes information to convert the first aspect ratio to a second aspect ratio. Included in the video distribution system are a distribution point and a video converter remote the distribution point. The video converter receives the information and the video program from the distribution point. The video converter uses the information to guide conversion between the first aspect ratio and the second aspect ratio.

Figure 1:
FIG. 1 is a diagram of a conventional 16:9 aspect ratio display.
Figure 2:
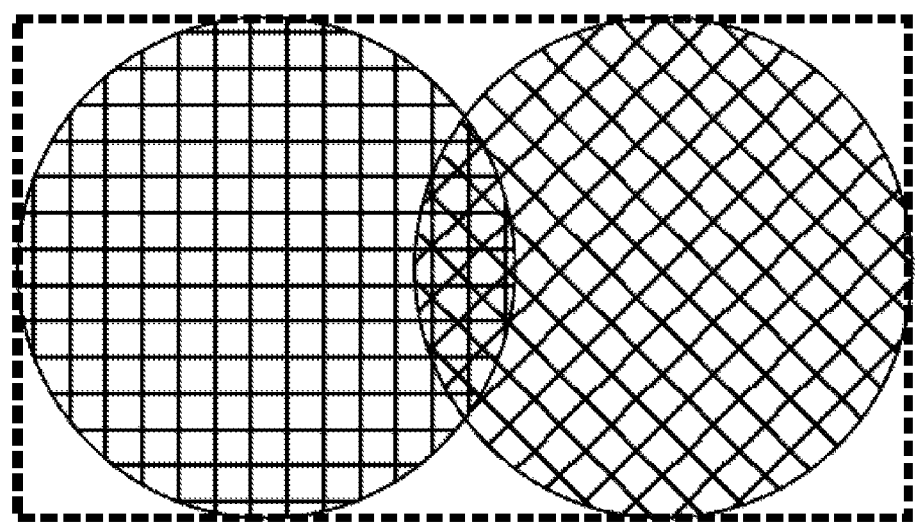
FIG. 2 is a diagram of a conventional 16:9 aspect ratio image.
Figure 3:
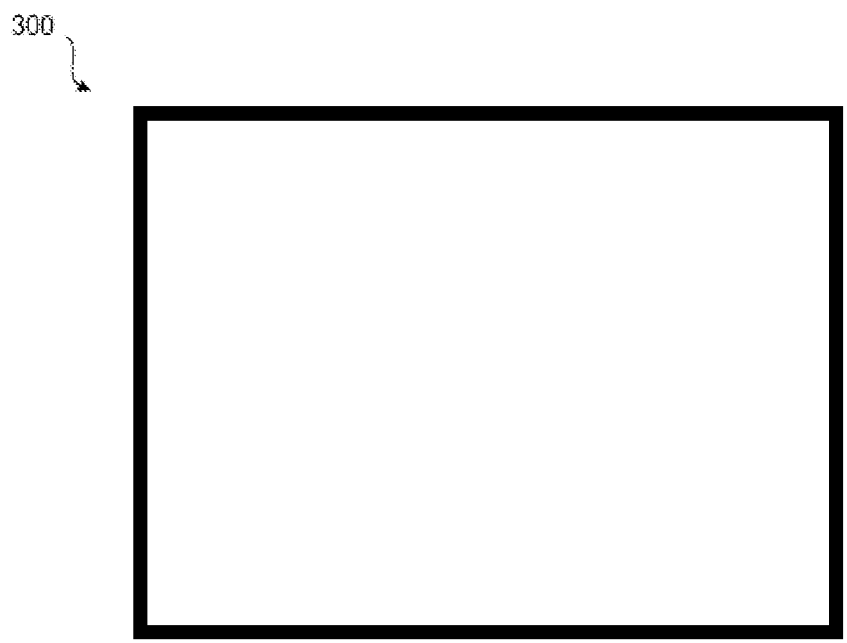
FIG. 3 is a diagram of a conventional 4:3 aspect ratio display.
Figure 4:
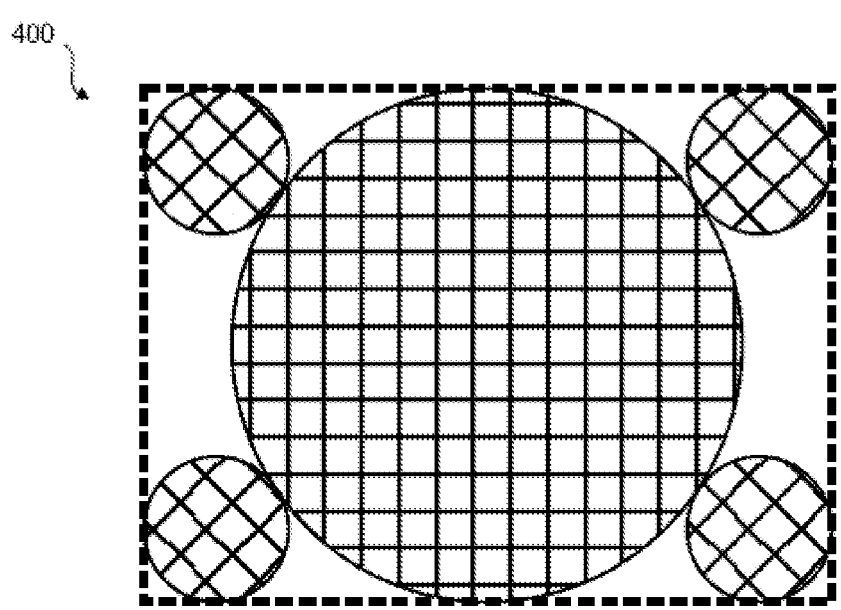
FIG. 4 is a diagram of a conventional 4:3 aspect ratio image.
Figure 5:
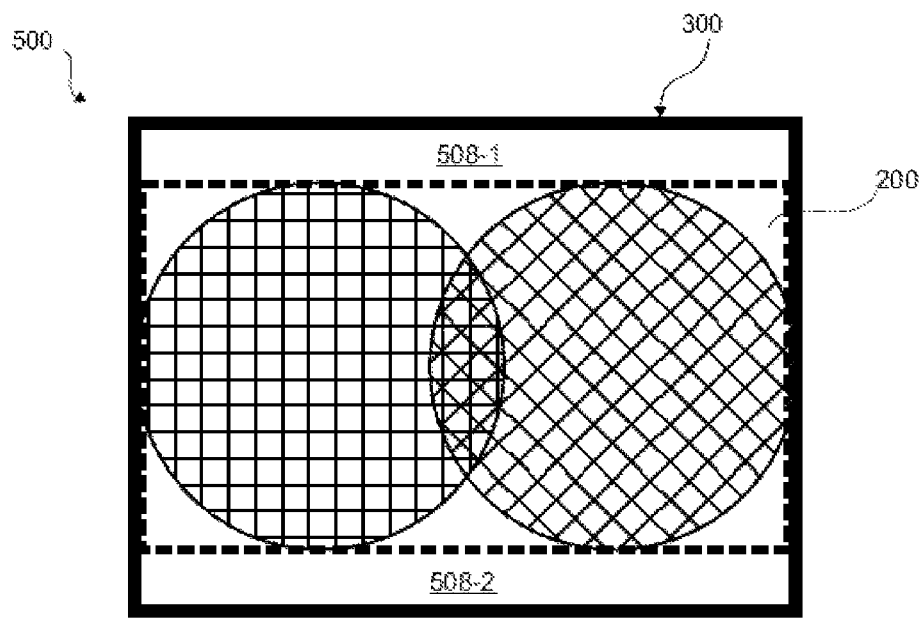
FIG. 5 is a diagram of a 4:3 aspect ratio display that shows a 16:9 aspect ratio image in a conventional letterbox format.
Figure 6:
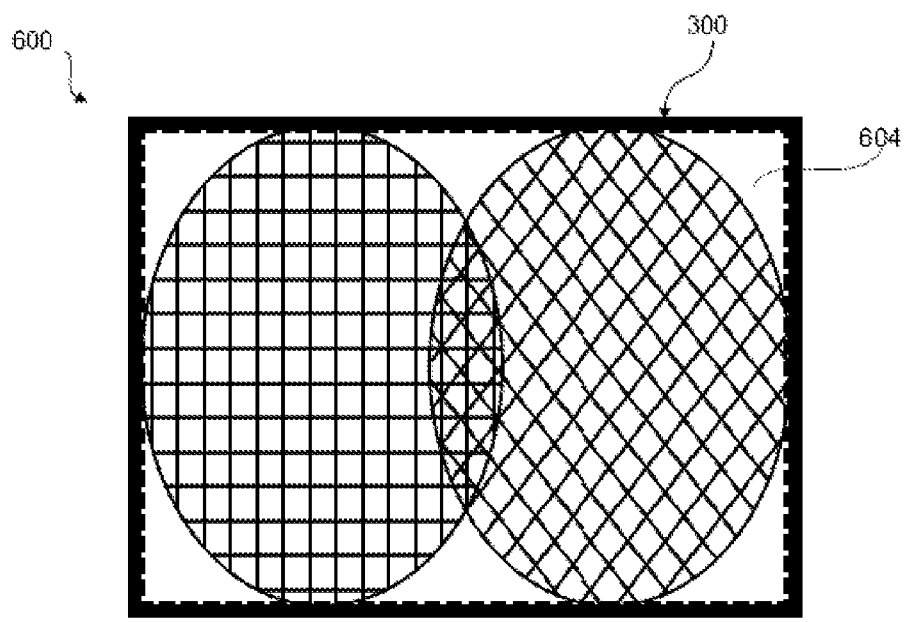
FIG. 6 is a diagram of a 4:3 aspect ratio display that shows a 16:9 aspect ratio image using a conventional vertical stretch.
Figure 7:
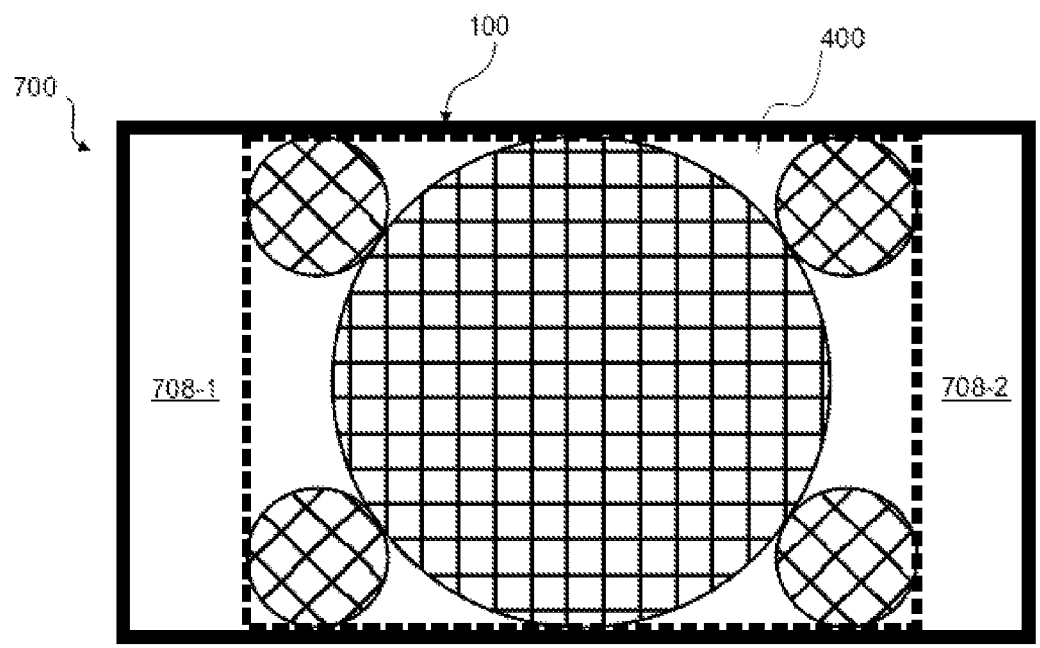
FIG. 7 is a diagram of a 16:9 aspect ratio display that shows a 4:3 aspect ratio image in a conventional pillar box format.
Figure 8:
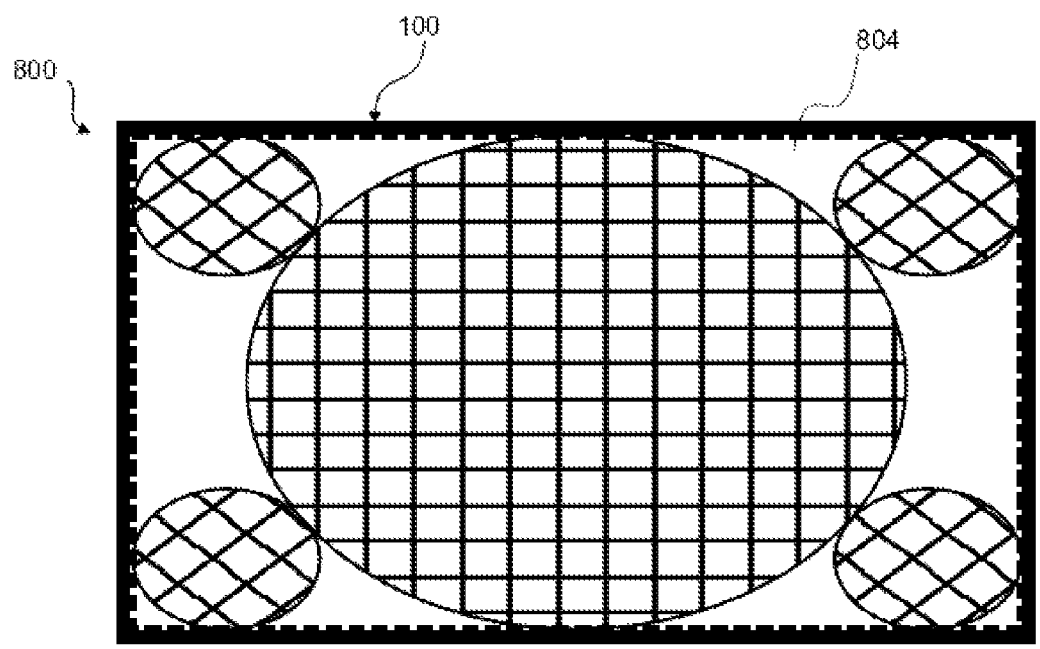
FIG. 8 is a diagram of a 16:9 aspect ratio display that shows a 4:3 aspect ratio image using a conventional horizontal stretch.
Figure 9:
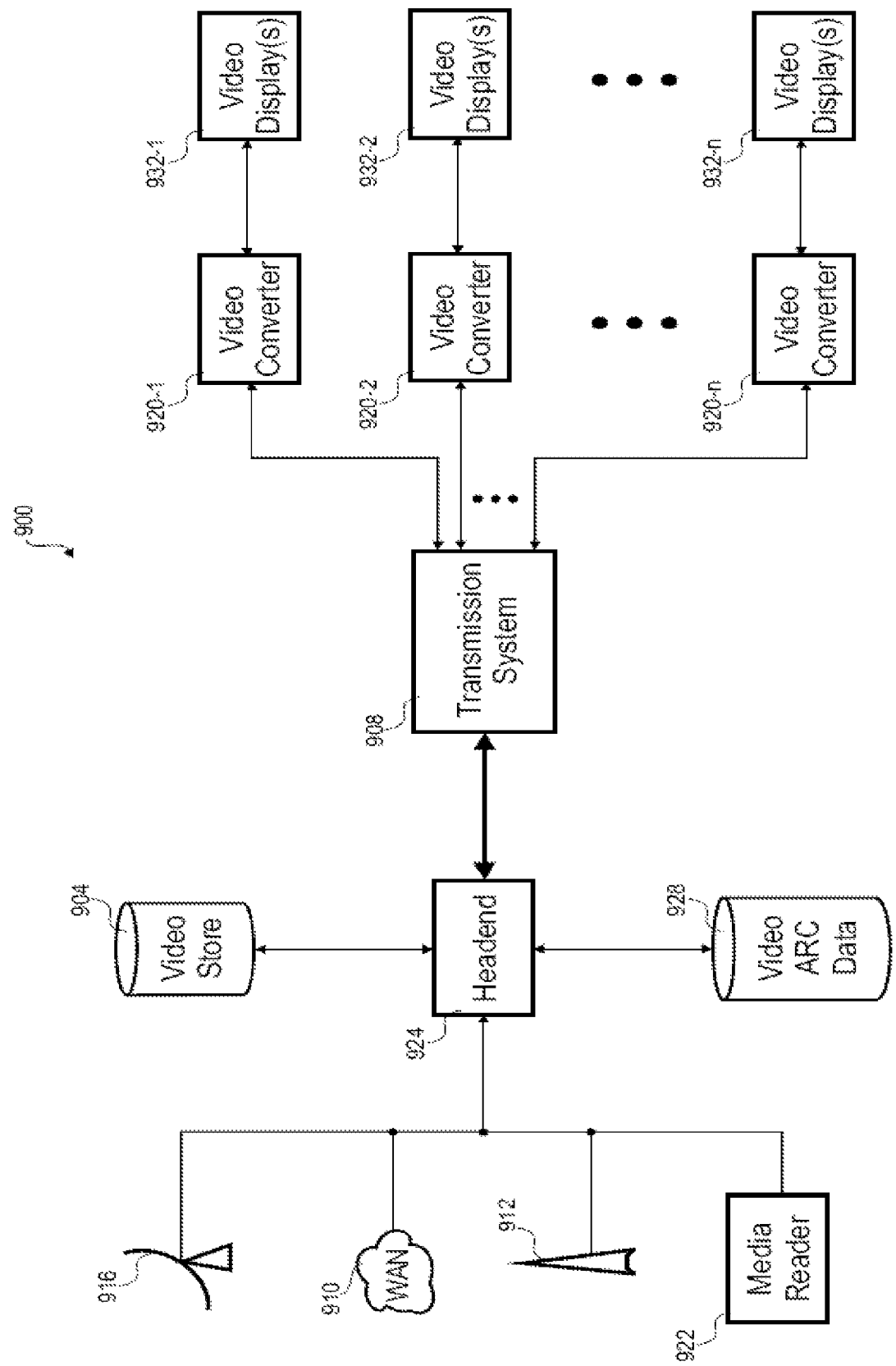
FIG. 9 is a block diagram of an embodiment of a video distribution system.

Referring first to FIG. 9, a block diagram of an embodiment of a video distribution system 900 is shown. This system 900 streams video programs to a number of users in a broadcast or single cast topology. The video programs are received from any number of sources, including, a satellite receiver 916, a wide area network (WAN) 910, a wireless antenna 912, and/or a media reader 922. The video programs may be stored in a video store 904 for later playback and/or streamed to the transmission system 908 when received. Programs on the video store 904 may be played in any on demand format, including, VOD, SVOD, pay per view, NVOD, remote PVR, etc.

The transmission system 908 could have many different configurations. For example, communication may be one way or bi-directional. In one embodiment, the transmission system 908 includes a hybrid fiber/coaxial transmission media and may include neighborhood nodes. Another embodiment uses a satellite link in the transmission system 908 to communicate video programs. Other embodiments may use vDSL, wireless television (e.g., wireless VOD, microwave line of sight, non-line of sight, etc.), terrestrial broadcast, and/or Internet distribution (broadband modem, DSL, cable modem, wireless data, satellite data, etc.) in the transmission system 908.

Video images distributed by the system 900 may include video aspect ratio conversion (ARC) data 928 to indicate how to convert from one aspect ratio to another. Where no ARC data 928 is available, the video conversion may use some conventional technique. For any programs that are played in the future, the conversion parameters are stored in a video ARC database 928. The video ARC data may be embedded as metadata in a video stream or sent separately from the video stream. In some embodiments, the headend can automatically generate the video ARC data where there is none.

A video converter 920 processes a received video image having a first aspect ratio to produce another video image having a second aspect ratio. In some cases, the first and second aspect ratios are the same, but only a subset of the received video image is used to produce the other video image. Some video converters 920 know the aspect ratio preferred by a video display 932 coupled to the video converter 920. Other video converters 920 produce a number of output aspect ratios from the received video image and the user can connect to any of them.

The video converter 920 may sense when an output cable is attached to a given port with a defined aspect ratio before producing a video image in that defined aspect ratio. Other embodiments, allow the user to configure the video converter for the aspect ratio(s) that will be used. The video converter could be located in the user location (e.g., within the set top box, video receiver, television, video modem, computer, and/or other equipment) or could be located remote to the user location (e.g., in a neighborhood node, the headend, a satellite, a satellite dish, an external video receiver, and/or other equipment). Some video equipment already has the ability to process video to change the aspect ratio and a simple software or firmware upgrade may allow remote manipulation of this process.

In various embodiments, the video display could be a movie theatre projector, a home theatre projector, a flat panel display, a CRT display, a television, a computer display, 3D display, a personal video player, a DVD player, a personal digital assistant (PDA), a wireless telephone, etc. Any aspect ratio conversion could be supported from a single video stream. The video display could be wired to the video converter or be wireless. Home theaters with curtains or masking to match the aspect ratio could be automatically activated according to the chosen aspect ratio for display.

A user of the video converter 920 may be able to customize how the aspect ratio is converted for one or more programs. In the simplest form, the user could override the video ARC data to use a letterbox or pillar box format. Other customizations include disabling non-linear scaling, aperture rotation, etc. This could be done for an individual program or for all programs. There may be a select number of preset profiles available to the user and some could be customized. For example, the automatic selection would just use the ARC data, but another setting would take the 16:9 aspect ratio and letterbox it.

In some embodiments, a PVR may record the received video image before conversion. The video ARC data would also be stored to allow later conversion according to the video display chosen for playback. The PVR may serve any number of displays having different aspect ratios and the conversion could be done when playback is selected. Some embodiments may perform the conversion before storing on the PVR.

Figure 10:
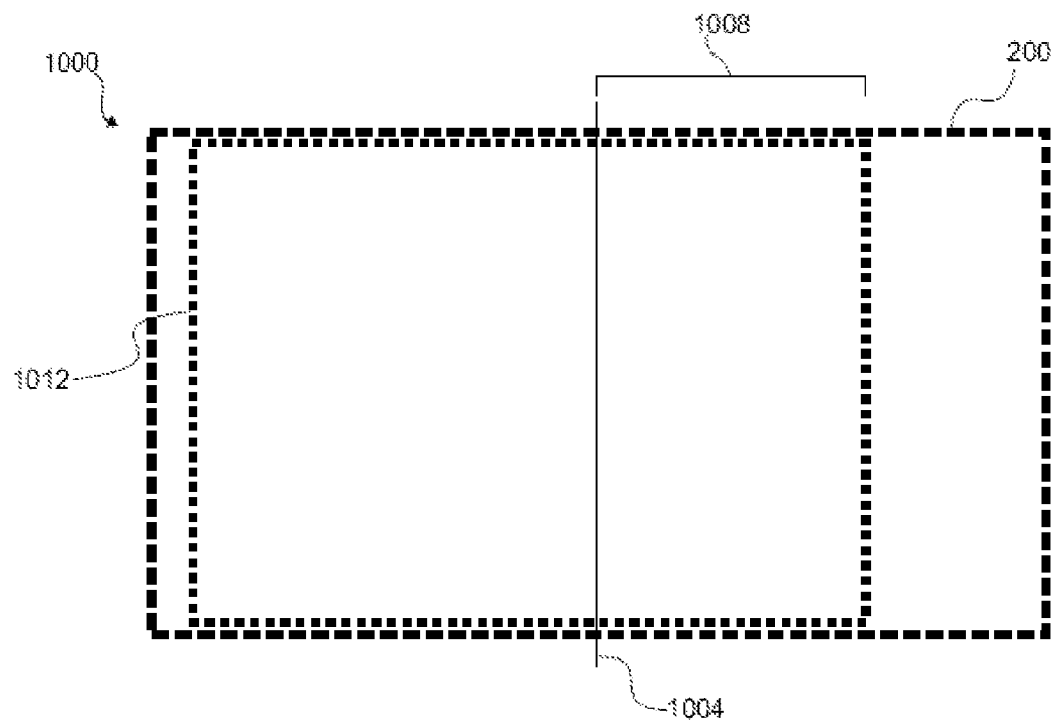
FIG. 10 is a diagram of an embodiment of an 16:9 aspect ratio image with an 4:3 aspect ratio aperture overlaid.

With reference to FIG. 10, a diagram of an embodiment 1000 of the 16:9 aspect ratio image 200 is shown with an 4:3 aspect ratio aperture or cutout 1012 overlaid thereon. The video image 200 is received in a 16:9 aspect ratio, but then processed by the video converter 920 to only display a portion corresponding to the 4:3 aperture 1012. A horizontal position 1008 is an offset of the right edge of the 4:3 aperture from a vertical centerline 1004 of the 16:9 image. This horizontal position 1008 varies to capture the best positioning of the 4:3 aperture. Changes in the horizontal position 1008 are communicated to the video converter 920.

The position of the 4:3 aspect ratio aperture 1012 could be chosen by the director, a technician or desired automatically. In one embodiment, a computer compares two versions of the program having different aspect ratios to determine how the movement of the aperture was chosen. Often programs are available on DVD or to content providers in two alternative aspect ratios. Rather than transporting both formats to each user, the content provider only provides one aspect ratio, but includes video ARC data so the video converter 920 can more effectively produce the aspect ratio desired by the user.

Other embodiments might also specify a vertical position for the 4:3 aperture 1012. Where the aperture 1012 doesn't match the resolution of the output aspect ratio, an up-conversion or down-conversion is performed. Some embodiments may provide for a non-linear scaling such that one portion of the 4:3 aperture 1012 is scaled more than another portion. When it is known that the ARC data will indicate scaling, graphics, text and images can be chosen that are less prone to show the scaling. In various embodiments, a video signal of a given aspect ratio may have any number of resolutions. For example, the video signal may be a 4:3 aspect ratio, but have enough resolution to support taking a 16:9 cutout without any loss of resolution.

Figure 11:
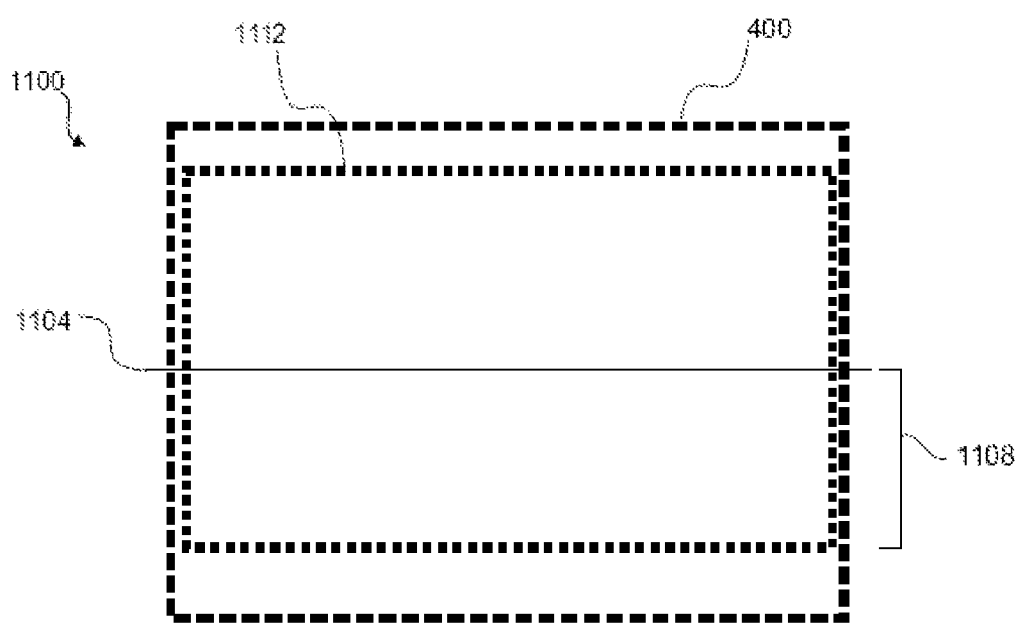
FIG. 11 is a diagram of an embodiment of an 4:3 aspect ratio image with to an 16:9 aspect ratio aperture overlaid.

Referring next to FIG. 11, a diagram of an embodiment 1100 of the 4:3 aspect ratio image 400 with an 16:9 aspect ratio aperture 1112 is shown. A vertical position 1108 indicates the variance of the bottom of the 16:9 aperture 1112 from a horizontal centerline 1104. Although this embodiment only has one degree of freedom for the aperture, other embodiments could also allow specifying the horizontal position, scaling, angular rotation, any mirroring, image correction, aperture size, scaling algorithm, and/or other video processing to be performed by the video converter 920.

In one embodiment, a single 16:9 aspect video image has multiple video streams. For example, different camera angles for a sports program may be included. The user may be able to specify to the video converter which video stream to display by moving an aperture through the received video image. If the user did not change the selection, the video ARC data would be used to move the aperture between the various video streams.

Figure 12:
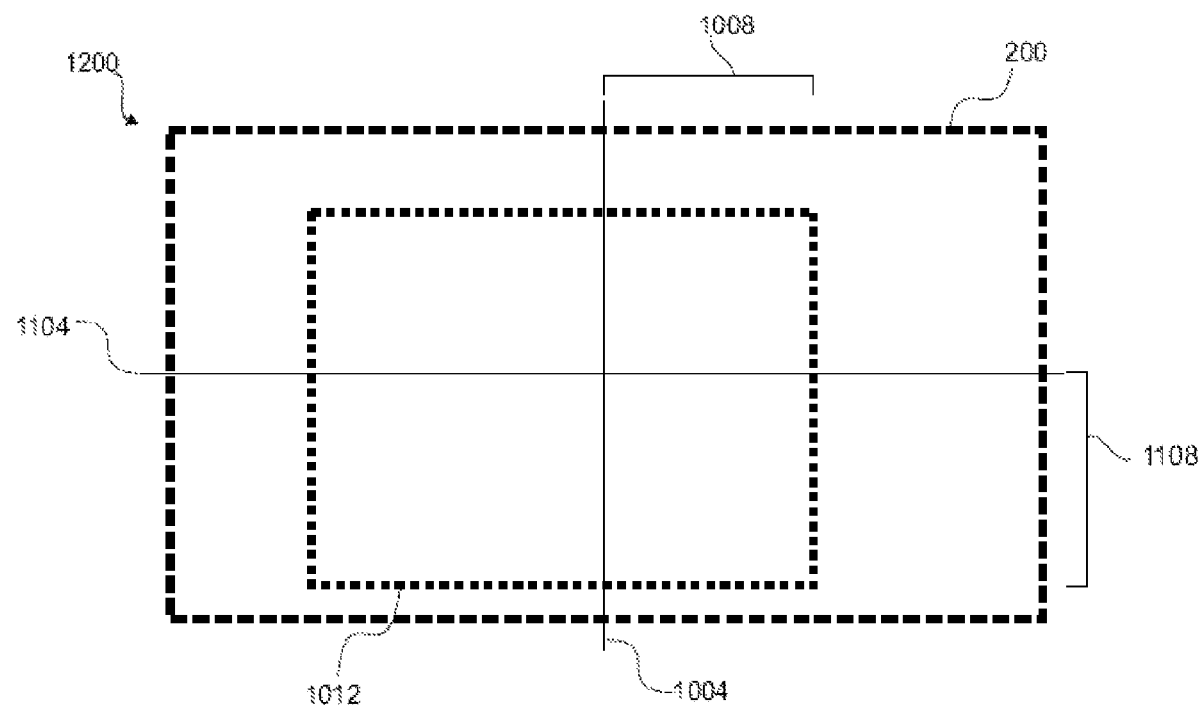
FIG. 12 is a diagram of yet another embodiment of an 16:9 aspect ratio image with an 4:3 aspect ratio aperture moving with two degrees of freedom.

With reference to FIG. 12, a diagram of yet another embodiment 1200 of the 16:9 aspect ratio image 200 with the 4:3 aspect ratio aperture 1012 moving with two degrees of freedom. The horizontal and vertical positions 1008, 1108 indicate an offset of the 4:3 aperture 1012 from a center of the 16:9 image 200. The 4:3 aperture could be of any size and later scaled by the video converter 920 for the resolution of the target video display 932.

Figure 13:
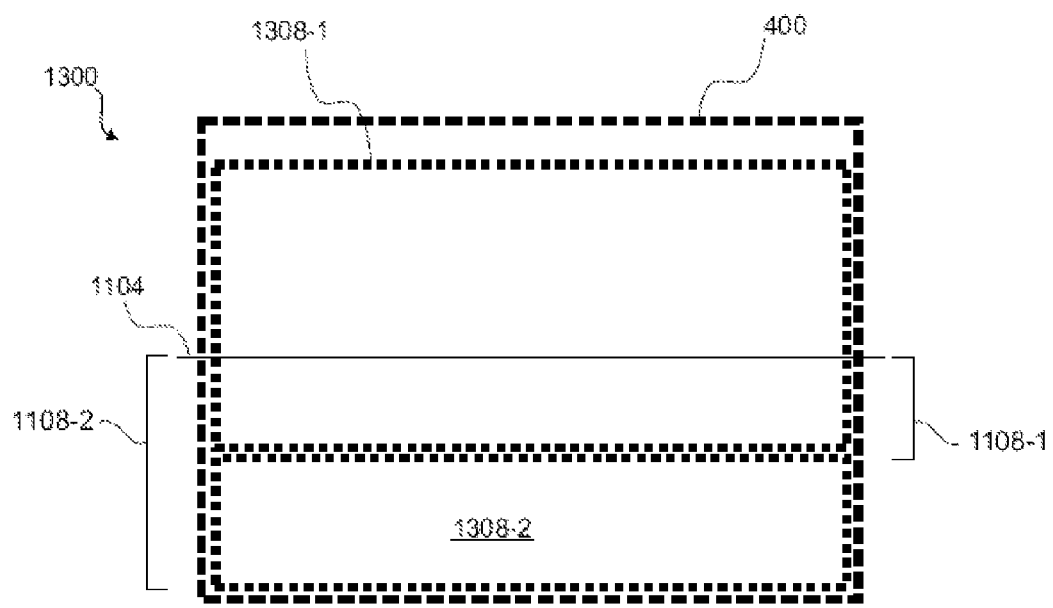
FIG. 13 is a diagram of an embodiment of an 4:3 aspect ratio image with a first and a second apertures overlaid.

Referring next to FIG. 13, a diagram showing an embodiment 1300 of the 4:3 aspect ratio image 400 with a first aperture and a second aperture 1308-1, 1308-2 overlaid. The two apertures 1308 are separately specified and manipulated to produce a 16:9 image that is presented on the video display 932. In this example, the first aperture 1308-1 is taller than the second aperture 1308-2. A first vertical position 1108-1 is specified for the bottom edge of the first aperture 1308-1 and a second vertical position 1108-2 is specified for the bottom edge of the second aperture 1308-2.

To reformulate the presented video image, the first and second apertures 1308 are processed and stitched together. In this example, the received 4:3 video image 400 is for a news channels which uses a talking head and graphics in the first aperture 1308-1 and a barker in the second aperture 1308-2 at the bottom of the screen. The first aperture 1308-1 is selected such that any important portions of the talking head and graphics are not unusually cropped. The height of the first aperture 1308 may be only slightly compressed in height during the conversion. The barker in the second aperture 1308-2 can be more aggressively compressed in height during the conversion as the resolution of the display video image will still allow any text to be readable. In this way, most of the substance of the 4:3 image 400 can be presented full-screen on the video display 932 without resort to pillar boxing.

Figure 14:
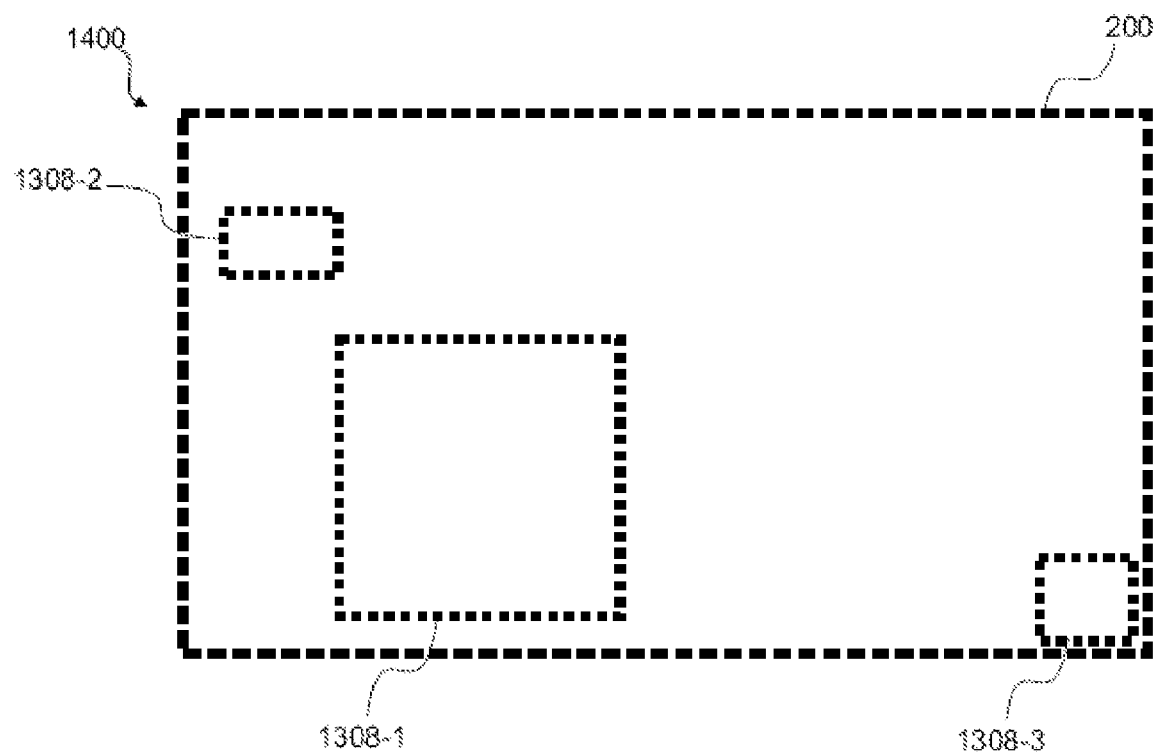
FIG. 14 is a diagram of an embodiment of a 16:9 aspect ratio image that has portions selected for conversion to a 4:3 aspect ratio image.
Figure 15:
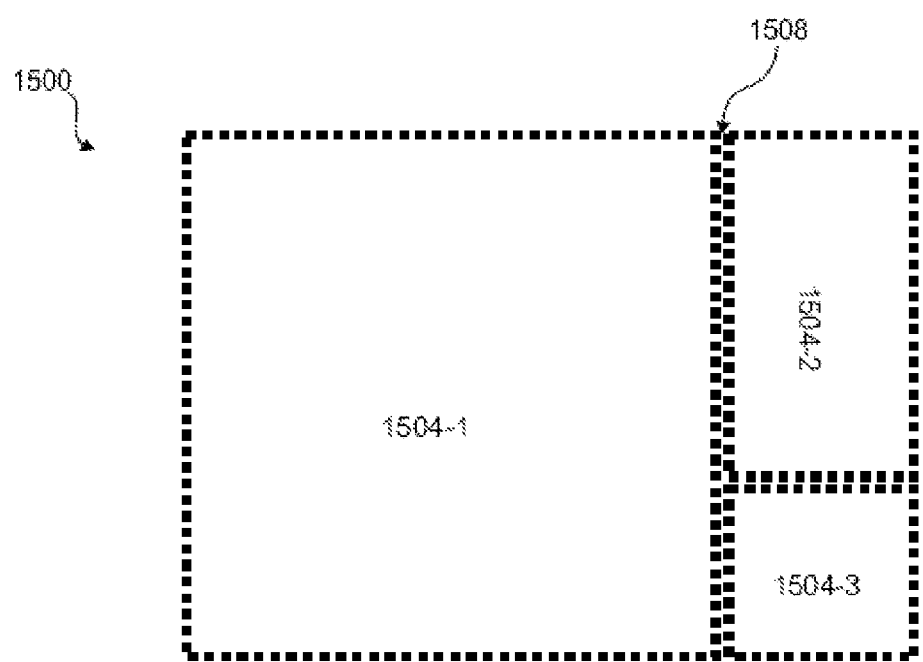
FIG. 15 is a diagram of an embodiment of a 4:3 aspect ratio image produced from portions selected in FIG. 14.

FIGS. 14 and 15 show an embodiment 1500 of a 16:9 video image 200 in FIG. 14 that is converted to a 4:3 display image 1508 in FIG. 15. Three apertures 1308 are selected from the 16:9 image 200 for presenting in on the video display 932 as a 4:3 video image 1508. A first aperture 1308-1 maps with the same resolution to a first portion 1504-1 of the 4:3 video image 1508. A second aperture 1308-2 is rotated ninety degrees and scaled-up to occupy a second portion 1504-2 of the 4:3 image 1508. A third aperture 1308-3 is down-scaled to occupy the a third portion 1504-3 of the 4:3 image 1508. The video ARC data may change or be suspended during commercial breaks or scene changes.

Some embodiments could indicate the mapping from aperture 1308 to portion 1504 on the production equipment such that the ARC data could be tested when the video is captured.

For example, the mapping could be defined in the camera and two screens could show the different aspect ratios.

Figure 16:
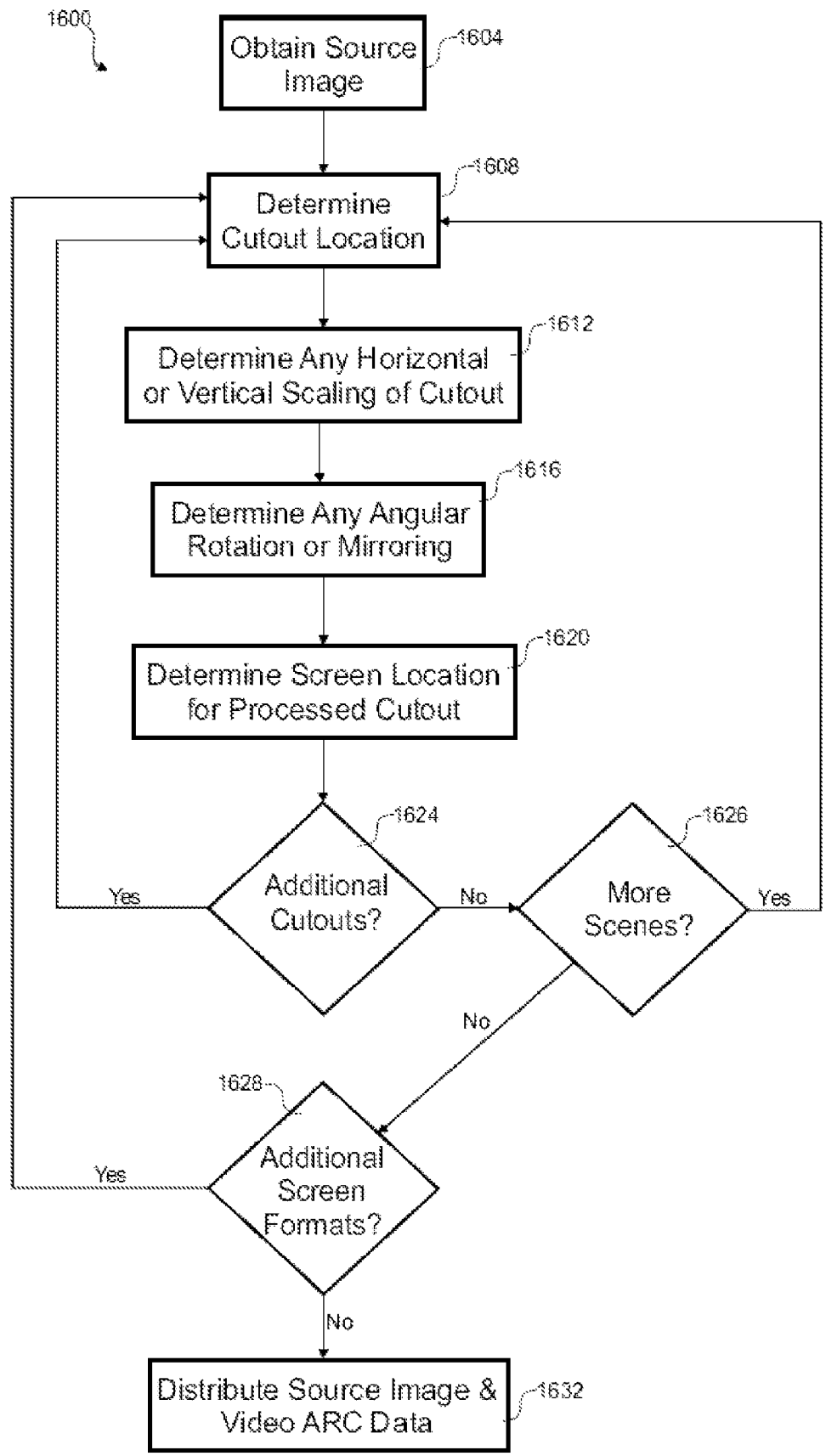
FIG. 16 is a flow diagram of an embodiment of a process for processing a video image for distribution to displays having different aspect ratios.

With reference to FIG. 16, a flow diagram 1600 of an embodiment of a process for processing a video image 200, 400 for distribution to displays 932 having different aspect ratios is shown. This processing could be performed in the headend, by a content provider or some party related to the owner of the program. Where there are already multiple versions of a program having different aspect ratios, the video ARC data could be automatically determined. A technician may have to check and clean-up the automated determination.

The depicted portion of the process 1600 begins in step 1604, where the source video is obtained in a predetermined aspect ratio. In an iterative manner, cutouts or apertures 1308 are chosen from the source video and assigned specified manipulations and mapped to the output video until all desired portions 1504 the output video are occupied. Each output aspect ratio has its video ARC data determined in succession.

In step 1608, a location of the cutout or aperture 1308 is determined. The manipulations suggested to the video converter 920 are specified in steps 1612, 1616 and 1620. Horizontal and vertical scaling is determined in step 1612. This may increase or decrease the pixels for the aperture 1308 such that the portion 1504 is occupied on the displayed image. The technician may specify non-linear scaling such that along a horizontal or vertical axis, the scaling changes. A histogram may be used to allow specifying the variance in scaling.

The aperture 1308 may have a rotation or mirror effect specified in step 1616. Placement of the processed cutout is determined in step 1620. The specification of apertures 1308 and their processing continues by looping back to step 1608. When all the video ARC data is specified for a given scene, the source video is advanced to the next scene with step 1626. Specification of the video ARC data continues iteratively for all the scenes of the source video. The video ARC data indicates the timing for changes in the processing throughout the program. When complete, step 1628 would loop back to step 1608 where additional aspect ratios to play the video should be specified. Once all aspect ratios are addressed, the video and the ARC data are distributed to the video store 904 or simply played in a linear schedule.

Some embodiments may leave some portions 1504 of the output video image blank and fill that space with any color background. Alternatively, advertising messages could be placed in the unused portion 1504. This could include filling the unused portions 508, 708 when doing a standard letterbox or pillar box presentation. Status information, cross-channel promotions and/or advertising could be placed in the unused portions 508, 708, 1504. The information to populate the unused portions could be sent in real time from the headend or sent earlier and stored for later insertion.

In some embodiments, the user can define information to put into portions 508, 708, 1504. This could include such things as stock tickers, stock alerts, weather information, traffic information, emergency alerts, news headlines, sports scores, movie theater show times, program guide listings, e-mail notifications, instant messaging notifications, caller ID information, etc. The defined information could include text, scrolling text, barker text, graphics, and/or video. The user could specify the portion 508, 708, 1504 to be used for a subset of channels or all channels. Presenting in the portion 508, 708, 1504 could be conditional on the channel and/or video format. For example, the pillar portions 708 could include weather information on channel four if the source aspect ratio was 4:3, etc.

In some embodiments, the headend 924 could distribute messages for display on a subset of the displays 932. The subsets could be defined by program tier, subscriptions, geographic region, demographic information, personal preferences, address of the account holder, or any other distinguishing factor. The messages could include still pictures, a graphic, text, scrolling text, barker text, audio, video in a window, and/or audio and/or video overlay. In one application, a emergency broadcast is performed to a limited geographic region that includes a siren and a barker. In another application, a promotional message is sent to a particular geographic region. The set top box or video converter 920 could determine a particular message is applicable to the user and insert the message in an unused portion 508, 708, 1504, could overlay part of the screen or simply choose a portion 1504 to replace with the message. The user could acknowledge and disable the distributed message.

Figure 17:
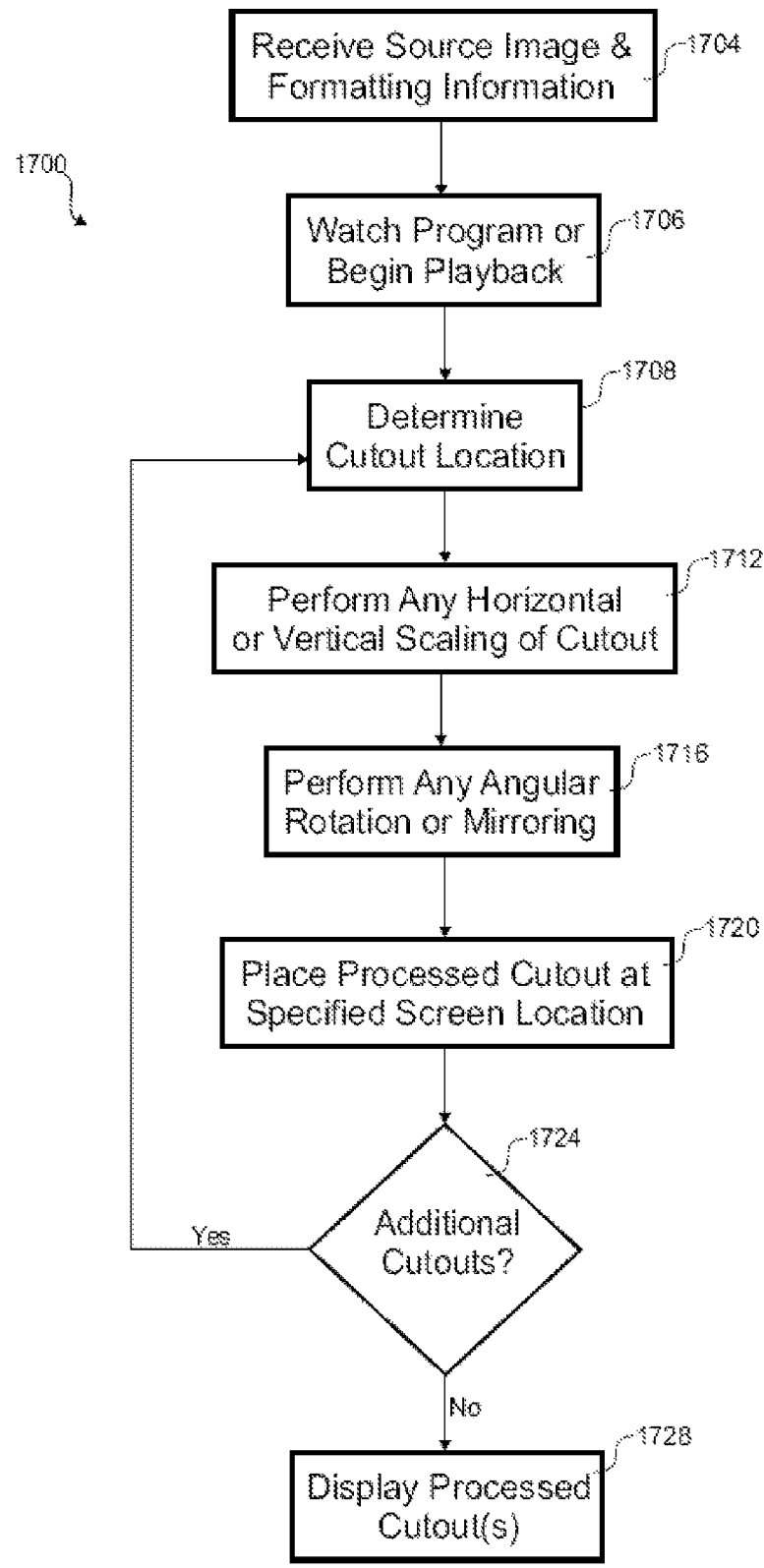
FIG. 17 is a flow diagram of an embodiment of a process for processing a video image for showing on a display having a different aspect ratio.

Referring next to FIG. 17, a flow diagram of an embodiment of a process 1700 for processing a video image 200, 400 for showing on a display 932 having a different aspect ratio. The video converter 920 receives the source image and formatting video ARC data in step 1704. The video ARC data may be embedded in the video stream or received separately. Once playback is requested in step 1706, the video converter locates the video ARC data and begins processing the video frames.

Each cutout or aperture 1308 is addressed in succession for the frame in steps 1708, 1712, 1216, and 1720 to formulate the portions of the displayed image 1508. In step 1708, the location of the cutout 1308 is determined. Any specified scaling is performed in step 1712. The rotation and mirroring that might be specified is performed in step 1716. In step 1720, the processed cutout is stitched into the specified portion 1504 of the image 1508. Where there are more cutouts 1308 specified in the video ARC data, processing loops back to step 1708. Once all specified portions are added to the image 1508, it is displayed in step 1728.

A number of variations and modifications of the invention can also be used. For example, some embodiments could allow the user to override the image processing to be performed automatically according to the embedded video ARC data. Alternatively, the user could disable the automatic processing in favor of a letterbox or pillar box presentation. Alternatively, users could influence the metadata according to their preference. Typically, the producer decides the various parameters for manipulation, but the user could take over to modify any of the video ARC parameters, for example, to move the 4:3 displayed image aperture right or left through the source 16:9 image 200.

The electronics that modify the image could be located in the user location or away from the user location in various embodiments. For a broadcast program, the video converter 920 could recognize the metadata and apply the image manipulation for the display 932. For example, a set up screen in the set top box could allow the user to specify the aspect ratio preferred for the output of the set top box. Certain aspect ratios could be presumed. For example, the RCA and S-Video outputs could presume a 4:3 aspect ratio for the display and the HDTV could presume a 16:9 aspect ratio for the display. Both output types could be active at the same time such that one produced a processed image and the other produced the unprocessed image.

For displays that allow single-cast programs such as some on demand systems, the user could specify to the network node or headend, the aspect ratio of the display 932. The image processing could be done in the network node or headend before it is singlecasted to the user location. Systems like vDSL, that single cast all channels of programming, could pre-process the image in this way also.

Although the above conversion discussion focused primarily on 4:3 to 16:9 conversions, any aspect ratios could be performed in a similar manner. For example, aspect ratios for various theatrical releases, PAL, NTSC, etc. could be converted. The video producer could specify parameters for any number of display aspect ratios. The display aspect ratios could even include the various computer display aspect ratios.

Some embodiments could have different metadata to allow remote manipulation of the aspect ratio. That is to say, the metadata could be specified in any number of ways such that the proper portion from the source image is produced on the display. Any way to specify cropping and/or zooming could be used. In some embodiments, the metadata could be included with the video stream, while other embodiments could send the information to manipulate the image separately from the image. Indeed, the manipulation information could be sent through a different data channel that that used for the image.

Although some of the above embodiments contemplate program distribution to televisions, the invention can be applied to DVDs and theaters. A DVD today may store multiple aspect ratios. In one embodiment, the DVD could store a single aspect ratio and include ARC data to instruct the DVD player or other equipment on doing the conversion. Similarly, the ARC data could instruct the movie theater on how to accomplish any aspect ratio by adjusting the projection equipment or screen.

Digital Broadcast Format Statistical Multiplexer

An embodiment of the present invention uses a hi-definition/hi-resolution statistical multiplexer (H/HSM) to format a number of programs over multiple cable channels or multiple satellite transponders. These transponders or cable channels are used by cable and satellite television broadcasters to send a number of programs simultaneously over multiple carriers. In some circumstances, a transponder is used by a single content provider or shared among a number of content providers. The programs are distinguished in the datastream by program identifiers (PIDs). The PIDs are used to route the various programs in the datastream to different display channels. When a user selects a display channel, the corresponding program in the datastream is decoded for display on the television.

Digital television formats are divisible into subsets, such as, high definition television (HDTV) and high resolution television (HRTV). Generally, HDTV has better quality than HRTV, but with better quality comes higher bandwidth requirements from the datastream. For example, a number of HRTV programs could consume the same bandwidth of a single HDTV program. As those skilled in the art can appreciate, conservation of bandwidth is desirable.

From the viewer's perspective, the quality of some programs is similar irrespective of whether HDTV format or HRTV format is used. For example, many believe filmed programs are represented adequately in HRTV, but sports and concerts are better suited for HDTV. A given display channel could at times provide programs in HDTV format and provide programs in HRTV format at other times.

A display channel that runs movies and sporting events, for example, might use 480i HRTV for the films and 1080i HDTV for the games. If, for example, the display channel had a schedule that consisted of ⅔ movies and ⅓ films, it would transmit in the more efficient mode ⅔ of the time. Because the 480i HRTV transmissions use only about ⅓ the bandwidth in some cases, this kind of a scenario would enable the cable or satellite broadcaster to add an entire HRTV program on average to the datastream versus what would be available if the network telecast in 1080i HDTV full time. More specifically, when the first display channel were in HDTV mode there is no extra bandwidth, but there is bandwidth for two extra programs when in HRTV mode.

The H/HSM takes the programs and adds them to the datastream. As display channels switch between HDTV and HRTV formats, the H/HSM allocates and de-allocates bandwidth. Metadata could be sent with the program to indicate the decode format to the set top box. Alternatively, a separate control data channel could transport the formatting information for each program. Some embodiments could automatically recognize the format from the program stream itself.

Figure 18A:
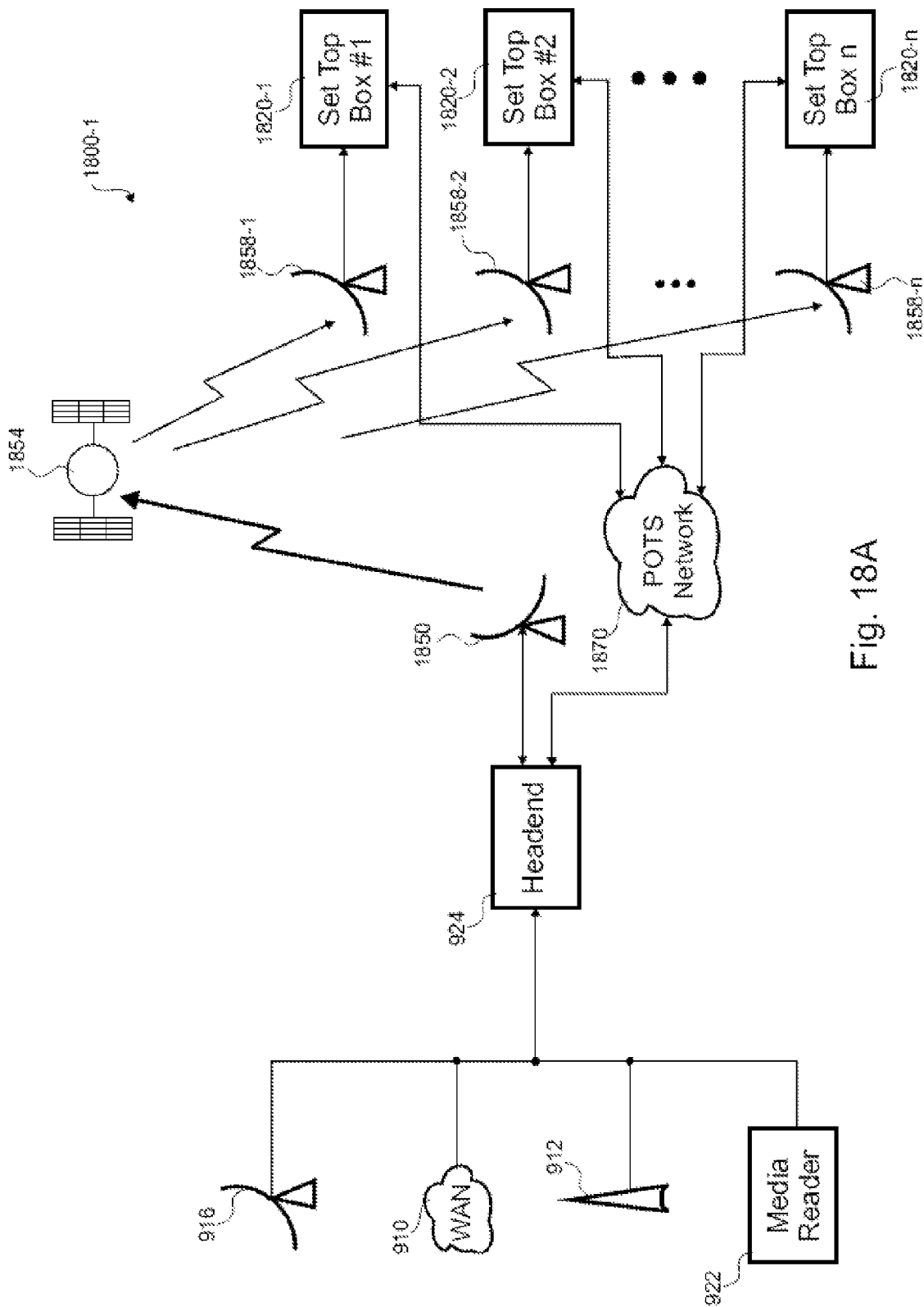
FIG. 18A is a block diagram of an embodiment of a direct broadcast satellite (DBS) system.

With reference to FIG. 18A, a block diagram of an embodiment of a direct broadcast satellite (DBS) system 1800-1 is shown. A headend 924 receives video programs from any of a satellite downlink 916, a wide area network (WAN) 910, a terrestrial antenna 912, and a media reader 922. The video programs are processed by the headend 924 and coupled to a satellite uplink 1850 and satellite 1854. A number of set top boxes 1820 use their respective satellite downlink 1858 to receive the video programs. The set top boxes 1820 could be stand-alone units or integral with another piece of video equipment, for example, a television. Control/data information is transported between the headend 924 and set top boxes using a POTS network 1870.

Figure 18B:
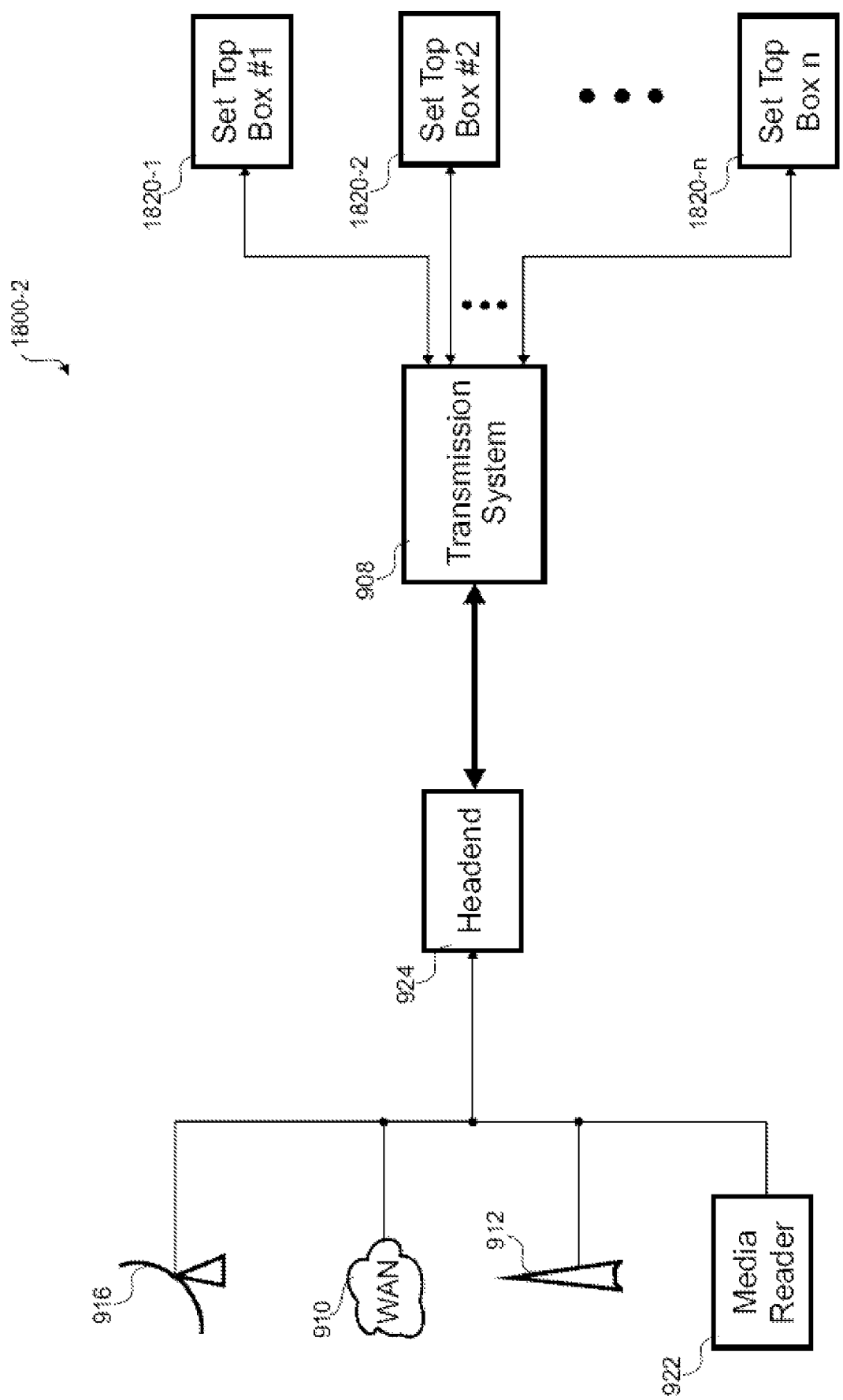
FIG. 18B is a block diagram of an embodiment of a cable system.

Referring next to FIG. 18B, a block diagram of an embodiment of a cable system 1800-2 is shown. This embodiment communicates bi-directionally between the headend 924 and set top boxes 1820 using a transmission system 908. A hybrid fiber/coaxial plant is used in the transmission system 908. Other embodiments could distribute programs using microwave transmission or VDSL, for example.

With reference to FIG. 19A, a block diagram of an embodiment of a video processing system 1900-1 for the DBS system 1800-1. The headend 924 processes video program streams 1932 from content providers. Generally, the video program streams 1932 are received in HDTV format, but could also be HRTV format. A video source processor 1904 determines if each program stream 1932 should be broadcast in either HDTV or HRTV format. This determination could be automatic and/or manual.

The video source processor 1904 could determine those programs which would suffer least from down-conversion to HRTV format. For example, 24 frame per second movies could be detected and automatically down-converted to HRTV. The available bandwidth or other considerations could be used when automatically down-converting some of the video program streams 1932. The content provider could control down-conversion or at least state a "best-efforts" preference to the video source processor. This preference information could be metadata or transported separately from the video program stream 1932. In some cases, the content provider could preemptively send a HRTV video program stream to the video source processor 1904 such that any down-conversion decision is obviated. In one embodiment, the video source processor 1904 down-converts film movies and some shows, but not sport events and concerts.

A H/HSM 1908 includes ten multiplexers 1914. Each multiplexer 1914 is coupled to a QAM-256 modulator 1920 and a satellite transponder 1924. Other modulation and transponders could be used in other embodiments. In this embodiment, each of the ten multiplexers 1914 can transport two HDTV video streams, six HRTV video streams, or one HDTV video stream and three HRTV video streams. Other embodiments could use different modulation rates, various HDTV and HRTV formats, different multiplexing ratios, different numbers of multiplexers or modulators, etc. Further, some embodiments could over-subscribe the HDTV multiplexer slots such that the video source processor 1904 is forced to do some down-conversion to broadcast all the video streams 1932.

In some cases, all program streams remain in HDTV format and occupy all twenty HDTV multiplexer slots. Most of the time, the video source processor 1904 is reducing some of the twenty video streams 1932 to HRTV such that all the multiplexer slots are not occupied. Filler bandwidth is coupled to the video source processor for use in the unused multiplexer 1914 slots. The filler bandwidth could be occupied for any digital information the set top box 1820 could receive, for example, advertisements, software, an additional program, VOD/SVOD programs for STB storage, program guide information, promotional trailers, DOCSIS data, VOIP data, firmware upgrades, Internet data, interactive television information, and/or other programs in the datastream having higher-bandwidth formats.

The set top boxes 1820 know which transponder and PIDs should be chosen to get a particular program for a particular display channel. For example, display channel three hundred and twelve could correspond to the fourth HRTV slot on the eighth transponder 1924-8. As the video source processor 1904 changes which video streams 1932 are down-converted over time, the slot and transponder 1924 could change. A control/data channel to the set top box 1820 is used to update the mapping between display channel and transponder/slot. In this way, a particular display channel corresponds to a particular video stream 1932 even though the transport path and PIDs may change.

Figure 19B:
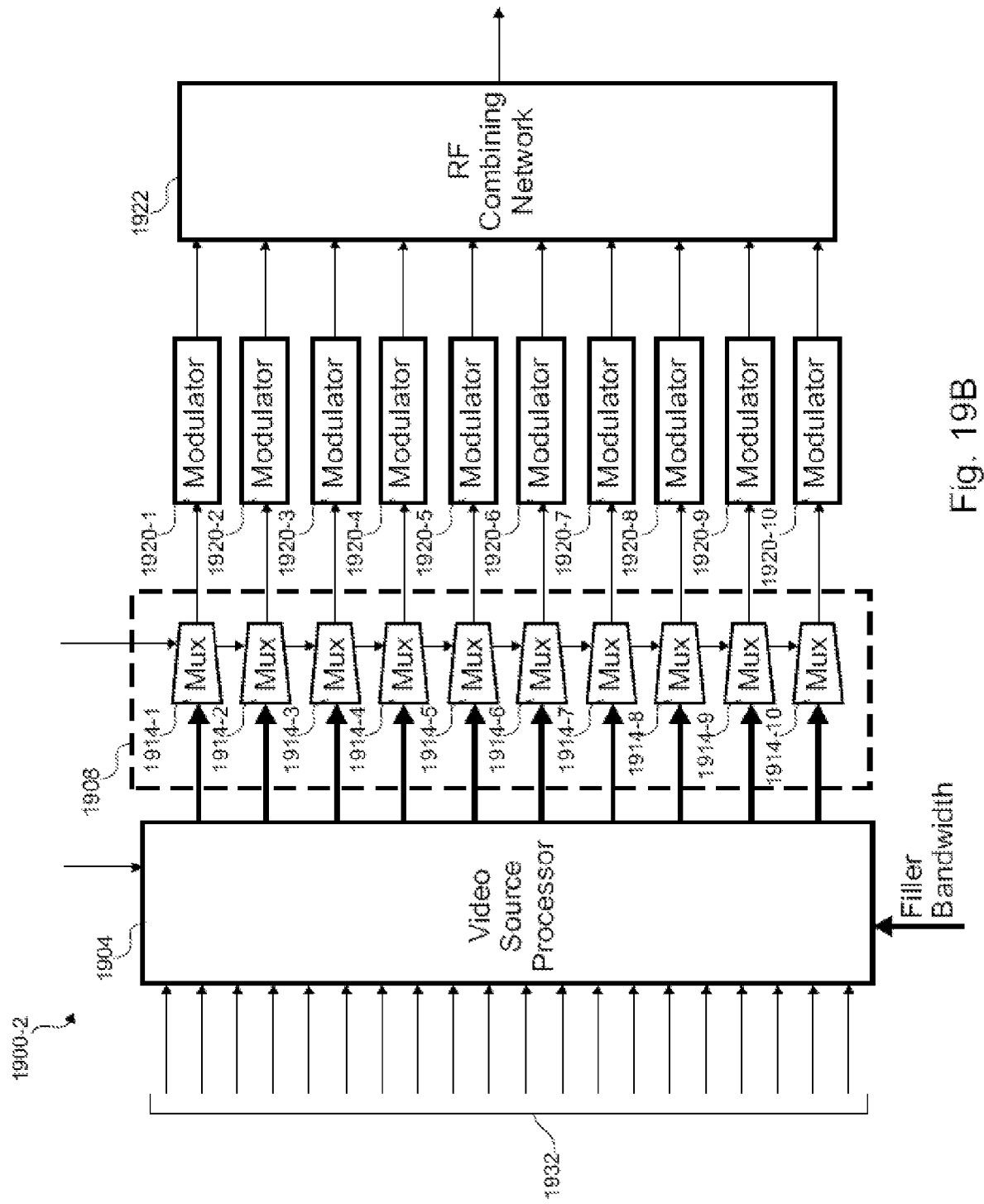
FIG. 19B is a block diagram of another embodiment of the video processing system for the cable system.

Referring next to FIG. 19B, a block diagram of another embodiment of the video processing system 1900-2 for the cable system 1800-2 is shown. In this embodiment, the modulators 1920 are combined onto a single conductor or fiber by the RF combining network 1922 before distribution over the hybrid fiber/coaxial plant.

Figure 20A:
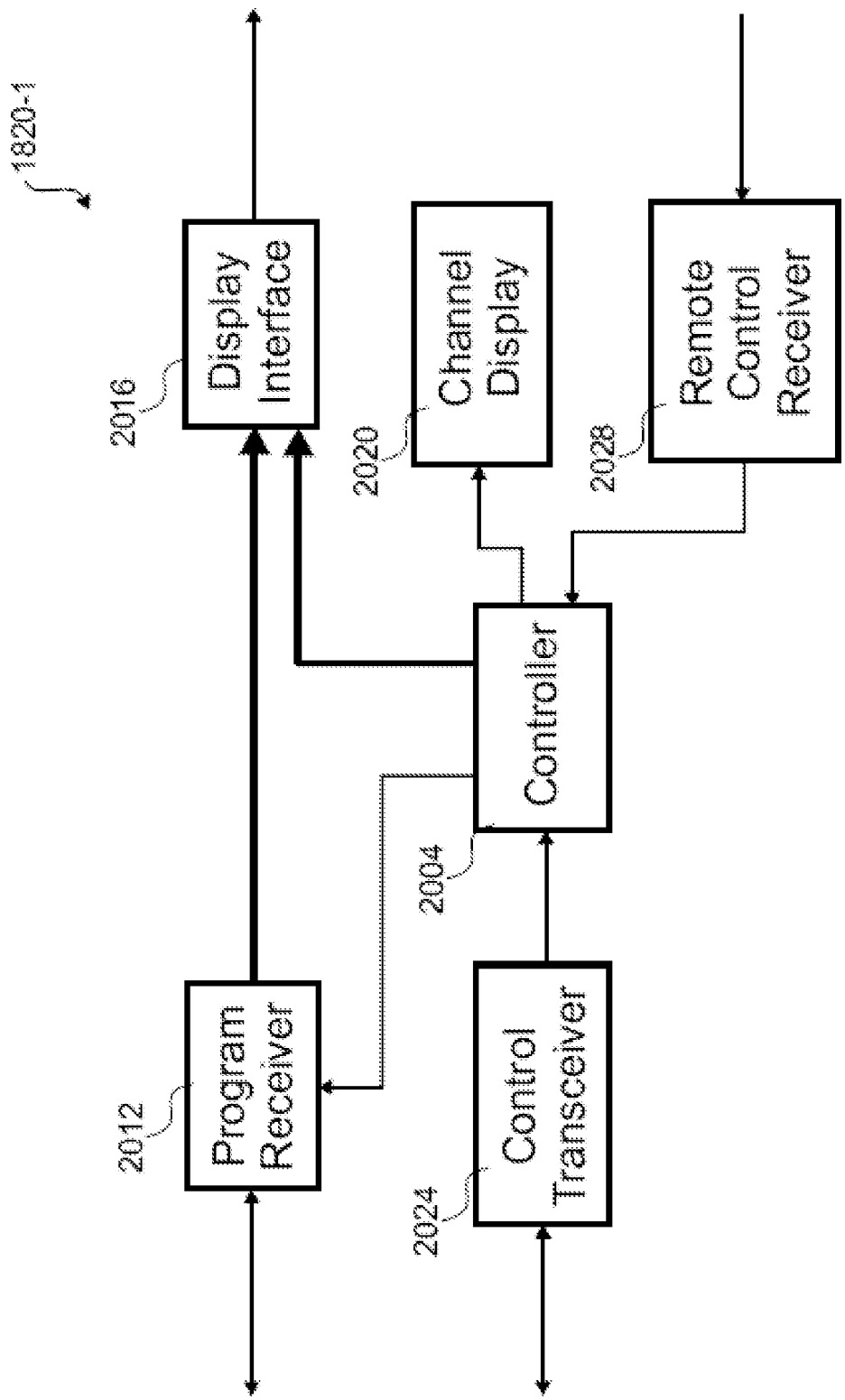
FIG. 20A is a block diagram of an embodiment of a set top box.

With reference to FIG. 20A, a block diagram of an embodiment of a set top box 1820-1 is shown. Satellite or cable program streams are decoded in the program receiver 3012 and coupled to the display interface 3016. A control transceiver 2024 receives the mapping to the display channel such that the controller 2014 can manipulate the program receiver 2012 to produce the proper program. The display channel is displayed on the channel display 2020 and changed with commands received by the remote control receiver 2028.

Figure 20B:
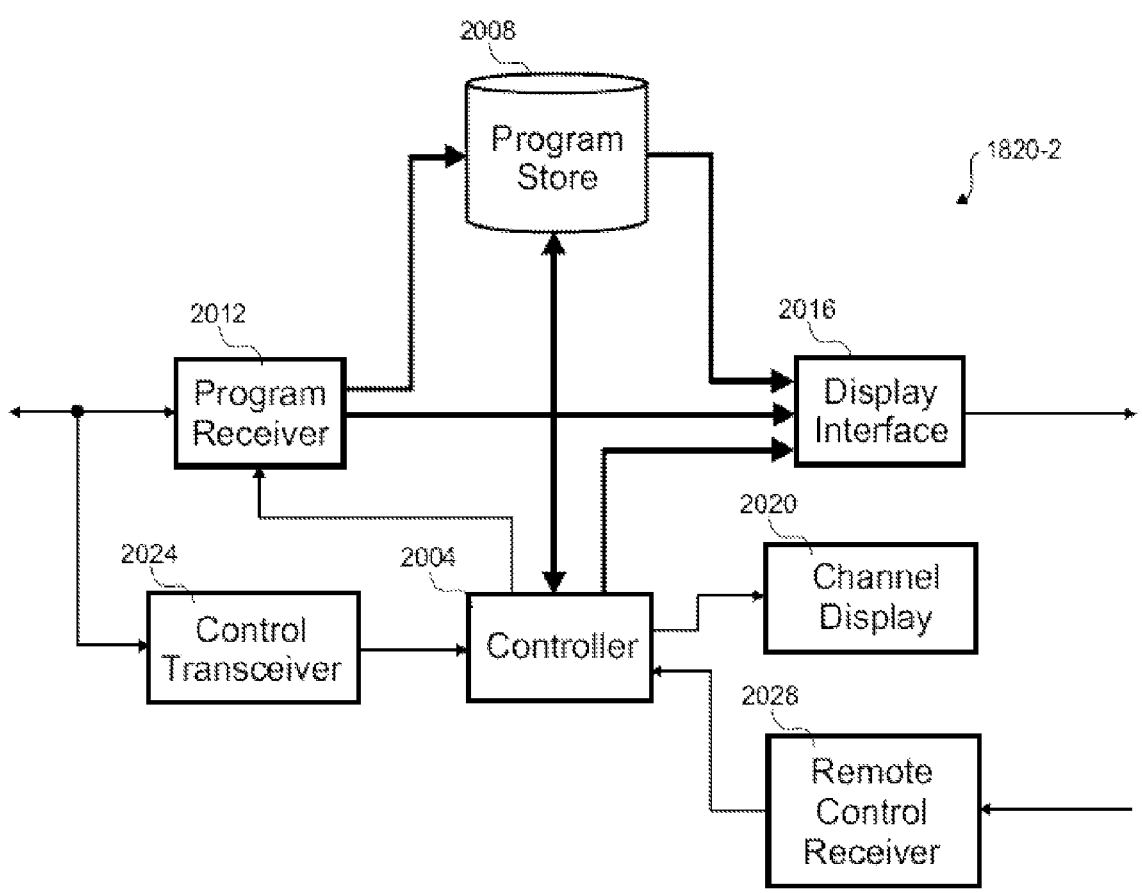
FIG. 20B is a block diagram of another embodiment of the set top box with program storage capability.

Referring next to FIG. 20B, a block diagram of another embodiment of the set top box 1820-2 with program storage capability is shown. This embodiment stores programs in the program store 2008 to enable DVR and/or SVOD functionality. Further the filler data could be stored in the program store 2010 for later use. For example, the filler data may include infomercials that are stored in the program store 2008.

While the principles of the invention have been described above in connection with specific apparatuses and methods, it is to be clearly understood that this description is made only by way of example and not as limitation on the scope of the invention.

What is claimed is:

1. A method for processing a video program and display information to show on a video display, the method comprising:
  specifying the display information at a video distribution station, wherein:
    the video distribution station is located at a first location; and
    the video distribution station stores and distributes a plurality of video programs through a transmission system;
  transmitting the video program and the display information from the video distribution station to a video converter device located at a second location through the transmission system, wherein the video converter device is configured to decode video program streams;
  processing the video program and the display information using the video conversion device at the second location to create video data indicative of a stream of output video images, wherein:
    the video data is configured such that each image of the stream of output video images, when shown on the video display, comprises:
      a first display portion in which the video program is shown, and
      one or more second display portions, the one or more second display portions comprising one or more unused portions of the video display located outside the first display portion in which the video program is shown,
    the one or more second display portions change dynamically across the stream of images; and
    one or more selections from a group consisting of: the display information; a shape, size, or orientation of at least one of the one or more second display portions; and one or more user preferences; is used to determine how at least a portion of the display information is displayed on the at least one of the one or more second display portions while the video program is shown on the first display portion of the video display; and
  transmitting the video data from the video conversion device to the video display.

2. The method for processing the video program and display information to show on the video display as recited in claim 1, further comprising:
  specifying, at the video distribution station at the first location, video conversion information for each of the stream of images comprising the video program, wherein the video conversion information:
    dynamically changes across the stream of images, and
    comprises manipulation information that specifies transformations relevant to a portion of the video program comprising a subset of the stream of images;
  transmitting the video conversion information to the video converter device at the second location; and
  processing the video conversion information using the video conversion device at the second location, wherein the video conversion information is used to modify the video program from a first aspect ratio to a second aspect ratio.

3. The method for processing the video program and display information to show on the video display as recited in claim 2, wherein the second aspect ratio is different than an aspect ratio of the video display.

4. The method for processing the video program and display information to show on the video display as recited in claim 2, wherein the processing step comprises processing a plurality of discreet portions of the video program to produce the second aspect ratio.

5. The method for processing the video program and display information to show on the video display as recited in claim 2, wherein,
  the video conversion information comprises a first subset of video conversion information and a second subset of video conversion information;

the stream of images comprises a first subset of images and a second subset of images;
the first subset of video conversion information guides the conversion of the first subset of images;
the first subset of video conversion information dynamically changes to the second subset of video conversion information; and
the second subset of video conversion information guides the conversion of the second subset of images.

6. The method for processing the video program and display information to show on the video display as recited in claim 2, wherein,
a set of video conversion information guides conversion at each image of a subset of the stream of images; and
the video program comprises a portion of a movie, television program, or other set of video information.

7. The method for processing the video program and display information to show on the video display as recited in claim 1, wherein the video data are transmitted in a single stream toward the video display.

8. The method for processing the video program and display information to show on the video display as recited in claim 1, wherein the processing the display information includes determining to dynamically change what is displayed on the at least one of the one or more unused portions when the video program is shown on the video display.

9. The method for processing the video program and display information to show on the video display as recited in claim 1, wherein the processing the display information occurs while the video program is shown on the video display.

10. The method for processing the video program and display information to show on the video display as recited in claim 1, wherein the display information includes visual information to be shown on the at least one of the one or more unused portions when the video program is shown on the video display.

11. The method for processing the video program and display information to show on the video display as recited in claim 10, wherein the visual information includes at least one item selected from the group consisting of:
status information,
cross-channel promotions, and
advertising.

12. The method for processing the video program and display information to show on the video display as recited in claim 10, wherein the visual information includes at least one item selected from the group consisting of:
text,
scrolling text,
barker text,
graphics, and
video.

13. A non-transitory computer-readable medium having computer-executable instructions for performing the computer-implementable method for processing the video program and display information to show on the video display, as recited in claim 1.

14. A video distribution system that distributes a stream of images comprising a video program and visual information, the video distribution system comprising:
a video distribution station located at a first location and configured to transmit the video program and display information, wherein the video distribution station stores and distributes a plurality of video programs through a transmission system;
a video converter device located at a second location remote from the video distribution station and configured to:
decode video program streams;
receive the transmitted video program and display information from the video distribution station through the transmission system;
process the video program and the display information to create video data indicative of a stream of output video images, wherein:
the video data is configured such that each image of the stream of output video images, when shown on a video display, comprises:
a first display portion in which the video program is shown; and
one or more second display portions, the one or more second display portions comprising one or more unused portions of the video display located outside the first display portion in which the video program is shown;
the one or more second display portions change dynamically across the stream of images; and
one or more selections from a group consisting of: the display information; a shape, size, or orientation of at least one of the one or more second display portions; and one or more user preferences; is used to determine how at least a portion of the display information is displayed on the at least one of the one or more second display portions while the video program is shown on the first display portion of the video display; and
transmit the formatted video program to the video display.

15. The video distribution system that distributes the stream of images comprising the video program and the visual information as recited in claim 14, wherein:
the video distribution station further is configured to transmit dynamically changing video conversion information for the stream of images comprising the video program;
the video program is formatted for viewing in both a first aspect ratio and in a second aspect ratio according to the conversion information;
the conversion information comprises manipulation information that specifies transformations relevant to a portion of the video program comprising a subset of the stream of images; and
the video converter device further is configured to:
receive the transmitted video conversion information from the video distribution station, and
format the video program to conform with the first aspect ratio or the second aspect ratio.

16. The video distribution system that distributes the stream of images comprising the video program and the visual information as recited in claim 15, wherein the second aspect ratio is different than an aspect ratio of the video display.

17. The video distribution system that distributes the stream of images comprising the video program and the visual information as recited in claim 14, further comprising the video display, coupled to the video converter device.

18. The video distribution system that distributes the stream of images comprising the video program and the visual information as recited in claim 14, wherein the video converter device is configured to receive preference information, indicative of the one or more user preferences.

19. A method for processing a video program having a first aspect ratio different from a second aspect ratio of a display, the method comprising steps of:

specifying, at a video distribution station at a first location, video conversion information for each of a stream of images comprising the video program, wherein:

the video distribution station stores and distributes a plurality of video programs through a transmission system;

the video conversion information dynamically changes across the stream of images;

the video conversion information can be used to modify display of the video program over time for the display, the video conversion information comprises first manipulation information and second manipulation information, the first manipulation information specifies transformations relevant to a first portion of the video program comprising a first subset of the stream of images, and the second manipulation information specifies transformations relevant to a second portion of the video program comprising a second subset of the stream of images, the second subset different from the first subset;

transmitting the conversion information and the stream of images of the video program having the first aspect ratio to a video conversion device located at a second location through the transmission system, wherein the video converter device is configured to decode video program streams; and transmitting display information to the video conversion device, wherein:

the stream of output video images, when shown on a video display, comprises:

a first display portion in which the video program is shown; and one or more second display portions, the one or more second display portions comprising one or more unused portions of the video display located outside the first display portion in which the video program is shown;

the one or more second display portions change dynamically across the stream of images; and one or more selections from a group consisting of: the display information; a shape, size, or orientation of at least one of the one or more second display portions; and one or more user preferences; is used to determine how at least a portion of the display information is displayed on the at least one of the one or more second display portions while the video program is shown on the first display portion of the video display.

* * * * *